United States Patent [19]

Ross et al.

[11] 4,407,930
[45] Oct. 4, 1983

[54] PHOTOGRAPHIC PRODUCTS AND PROCESSES EMPLOYING SUBSTITUTED SULFONAMIDOPHENOL OR SULFONAMIDONAPHTHOL DYE-RELEASERS

[75] Inventors: Robert E. Ross; Lee J. Fleckenstein, both of Rochester; Michael E. Campbell, Kendall, all of N.Y.

[73] Assignee: Eastman Kodak Company, Rochester, N.Y.

[21] Appl. No.: 380,845

[22] Filed: May 21, 1982

[51] Int. Cl.$^3$ .................... G03C 1/40; G03C 1/10; G03C 5/54
[52] U.S. Cl. .................... 430/223; 430/242; 430/559
[58] Field of Search .................... 430/223, 242, 559

[56] References Cited

U.S. PATENT DOCUMENTS

| | | | |
|---|---|---|---|
| 4,053,312 | 10/1977 | Fleckenstein | 430/223 |
| 4,110,113 | 8/1978 | Melzer et al. | 430/223 |
| 4,336,322 | 6/1982 | Fujita et al. | 430/223 |
| 4,358,532 | 11/1982 | Koyama et al. | 430/223 |

*Primary Examiner*—Richard L. Schilling
*Attorney, Agent, or Firm*—Harold E. Cole

[57] ABSTRACT

Photographic elements, diffusion transfer assemblages and processes are described which employ a nondiffusible, redox, dye-releasing compound comprising a ballasted, sulfonamidophenol or sulfonamidonaphthol compound having a dye moiety attached thereto through the sulfonamido group of the compound, the sulfonamido group being located in a position which is conjugated with respect to the position of the hydroxy group of the compound, and wherein (a) the compound has at least one substituent thereon in a position which is conjugated with respect to the position of the sulfonamido group, the substituent being selected from the group consisting of hydroxy, sulfonamido, phosphonamido and carbonamido, and (b) the compound not having a hydroxy, alkoxy, aryloxy, sulfonamido, phosphonamido or carbonamido group thereon in a position which is conjugated with respect to the position of the hydroxy group of the compound, with the proviso that when the compound is a 2-sulfonamidophenol and has only one substituent thereon in a position which is conjugated with respect to the position of the sulfonamido group, then that one substituent is located in the 5-position. These dye-releasers release the dye moiety at a faster rate than similar dye-releasers of the prior art.

28 Claims, No Drawings

PHOTOGRAPHIC PRODUCTS AND PROCESSES EMPLOYING SUBSTITUTED SULFONAMIDOPHENOL OR SULFONAMIDONAPHTHOL DYE-RELEASERS

This application relates to photography, and more particularly to diffusion transfer photography employing sulfonamidophenol or sulfonamidonaphthol redox, dye-releasers (RDR's) having certain substituents therein. These RDR's release a given dye moiety at a faster rate than sulfonamidophenol and -naphthol RDR's of the prior art.

Sulfonamidophenol and sulfonamidonaphthol RDR's are well known in the prior art. In U.S. Pat. No. 4,195,993, various substituents in unspecified locations on such RDR's are disclosed. However, the specific substituents located in the specific locations on the RDR's disclosed herein are not disclosed in this patent.

In European Pat. No. 28,099 and French Pat. No. 2,424,568, sulfonamidophenols and sulfonamidonaphthols are disclosed having various substituents in positions which are conjugated, as this term is used herein, with respect to the position of the sulfonamido group. The sulfonamidophenols and sulfonamidonaphthols disclosed herein having certain specific substituents in a conjugated position with respect to the sulfonamido group, however, are not taught by these references.

U.S. Pat. Nos. 4,053,312, 4,258,120 and 3,928,312 disclose various sulfonamidophenol and -naphthol dye-releasers having various carbonamido or sulfonamido substituents thereon. These substituents, however, are not located in positions which are conjugated with respect to the location of the sulfonamido group as described herein.

In U.S. Pat. No. 4,055,428 and Japanese Published Patent Application No. 56/12642, 2-sulfonamidophenol dye-releasers are disclosed which may have a substituent thereon in a position which is conjugated with respect to the position of the sulfonamido group. Included among the list of such substituents is an acylamino group. However, these compounds also have an alkoxy or aryloxy group in a position which is conjugated with respect to the position of the hydroxy group. Such groups, as well as others, in that location have been found to be detrimental to the dye release rate, as will be shown by comparative tests hereinafter.

In German Published Patent Application No. 3,027,291, 2-sulfonamidophenol dye-releasers are disclosed which may have a substituent thereon in a position which may be conjugated with respect to the position of the sulfonamido group. Included among the list of such substituents is an acylamino group. However, these compounds also have an alkoxy or aryloxy group in the 5-position. We have found that 2-sulfonamidophenols should have a different substituent thereon in the 5-position in order to have a faster-rate of dye-release, as will be shown in the examples hereinafter.

U.S. Pat. No. 4,135,929 of Fernandez et al relates to sulfonamido RDR compounds which have a high degree of efficiency with respect to release of a dye moiety. While these compounds have proven to be very good for many applications, it would be desirable to provide RDR's which release dye at an even faster rate in order to reduce the dye transfer time. A diffusion transfer image could thus be obtainable in a shorter amount of time.

The release of dye from an immobile sulfonamidophenol (and naphthol) RDR is a two-step reaction:
(1) the oxidation of the immobile sulfonamidophenol by oxidized electron transfer agent (ETA) to the quinoneimide, and
(2) the hydrolysis of the quinoneimide (deamidation) to the immobile quinone and the diffusible sulfonamide dye.

The overall reaction is favored by a high (negative) reduction potential and a rapid deamidation rate.

We have found that certain substituents on a sulfonamidophenol or sulfonamidonaphthol RDR are polarizable or ionizable and enhance the reduction potential. Also, when these substituents are in positions which are conjugated with respect to the position of the sulfonamido dye-releasing group, deamidation is also enhanced.

We have also found that if these same substituents, as well as some others, are located in a position which is conjugated with respect to the position of the hydroxy group of a sulfonamidophenol or -naphthol, then the dye release rate is not enhanced.

SUMMARY OF THE INVENTION

A photographic element in accordance with our invention comprises a support having thereon at least one photosensitive silver halide emulsion layer, the emulsion layer having associated therewith a nondiffusible, redox, dye-releasing compound comprising a ballasted, sulfonamidophenol or sulfonamidonaphthol compound having a dye moiety attached thereto through the sulfonamido group of the compound, the sulfonamido group being located in a position which is conjugated with respect to the position of the hydroxy group of the compound, and wherein (a) the compound has at least one substituent thereon in a position which is conjugated with respect to the position of the sulfonamido group, the substituent being selected from the group consisting of hydroxy, sulfonamido, phosphonamido and carbonamido, and (b) the compound not having a hydroxy, alkoxy, aryloxy, sulfonamido, phosphonamido or carbonamido group thereon in a position which is conjugated with respect to the position of the hydroxy group of the compound, with the proviso that when the compound is a 2-sulfonamidophenol and has only one substituent thereon in a position which is conjugated with respect to the position of the sulfonamido group, then that one substituent is located in the 5-position.

DETAILED DESCRIPTION OF THE INVENTION

Two positions on benzene or naphthalene rings are said to be conjugated with respect to each other, when they are located at opposite ends of a ring double bond or at opposite ends of a series of conjugated double bonds, as represented in the tradiational Kekulé structures. In benzene, these positions are ortho or para to each other.

The sulfonamidophenol and sulfonamidonaphthol RDR's of this invention contain ionizable or polarizable activating substituents that develop full or partial negative charges under the alkaline conditions of their operation. Depending on the position of the activating substituent, this negative charge can be transmitted by shifting of double bonds to either the oxygen or nitrogen atom of the quinoneimide, which is the oxidized form of the RDR. If the activating substituent is in a position which is conjugated with respect to the position of the sulfonamido group of the RDR, as in the compounds of this invention, the negative charge will be transmitted to the oxygen atom of the quinoneimide, which facilitates hydrolytic attack on the quinoneimide group with resulting deamidation.

On the other hand, we have found that attachment of hydroxy, alkoxy, aryloxy, sulfonamido, phosphonamido or carbonamido groups at a position on the ring which is conjugated with respect to the position of the hydroxyl group of the RDR would result in transmittal of the negative charge to the nitrogen atom of the quinoneimide, which in turn would retard the hydrolytic attack and deamidation.

We have also found that when a 2-sulfonamidophenol is employed in our invention with only one substituent thereon in a position which is conjugated with respect to the position of the sulfonamido group, then that one substituent should be located in the 5-position rather than in the 3-position. If that one substituent is located in the 3-position instead, dye release is retarded, possibly because of steric hindrance.

In a preferred embodiment of our invention, the RDR's which can be employed are:

(1) 2-sulfonamidophenols

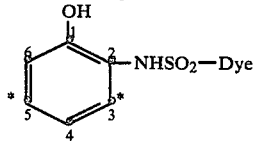

(2) 4-sulfonamidophenols

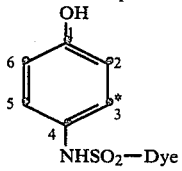

(3) 2-sulfonamido-1-naphthols

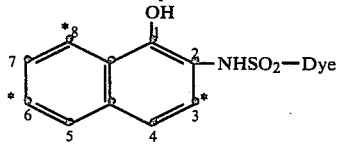

(4) 1-sulfonamido-2-naphthols

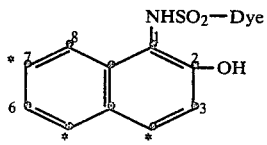

(5) 4-sulfonamido-1-naphthols

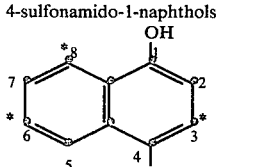

wherein * designates positions which are conjugated with respect to the position of the sulfonamido group and where the substituents defined above are located.

In another preferred embodiment of our invention, the substituent on the RDR compound described above is selected from the group consisting of OH, $NHSO_2R$ and NHCOR wherein R is alkyl having from 1 to about 40 carbon atoms such as methyl, ethyl, pentyl, dodecyl, hexadecyl, octadecyl, or eicosanyl; substituted alkyl having from 1 to about 40 carbon atoms such as the alkyl groups listed above substituted with groups such as alkoxy, aryloxy, sulfonamido, carbonamido, carbalkoxy, etc., e.g., $CH(C_2H_5)O\text{-m-}C_6H_4\text{-}C_{15}H_{31}\text{-n}$, $(CH_2)_4OC_6H_3\text{-}2,4\text{-}(C_5H_{11}\text{-t})_2$, $(CH_2)_4OC_6H_3\text{-}2,4\text{-}(C_8H_{17}\text{-t})_2$, or $(CH_2)_4NHSO_2C_{16}H_{33}$; aryl having from 6 to about 50 carbon atoms such as phenyl, naphthyl or pyridyl; or substituted aryl having from 6 to about 50 carbon atoms such as the aryl groups listed above substituted with carbamoyl, carbonamido, alkoxy, alkyl, etc., e.g., $\text{m-}C_6H_4\text{-CON-(n-}C_{18}H_{37})_2$, $\text{m-}C_6H_4\text{-CON(n-}C_8H_{17})_2$, or $\text{p-}C_6H_4\text{-OC}_{12}H_{25}$.

In yet another preferred embodiment of our invention, the substituent on the RDR compound described above is $NHSO_2\text{-m-}C_6H_4\text{-CON(n-}C_{18}H_{37})_2$, $NHSO_2\text{-m-}C_6H_4\text{-CON(n-}C_8H_{17})_2$, $NHSO_2\text{-n-}C_{16}H_{33}$ or $NHCOCH(C_2H_5)O\text{-m-}C_6H_4\text{-}C_{15}H_{31}\text{-n}$. Especially good results have been obtained when the substituent is a sulfonamido group.

When the substituent on the RDR compound as described above has more than about 8 carbon atoms, it can serve as the sole or a partial ballast for the RDR compound. Alternatively, a separate ballast substituent can be located on the ring system.

Compounds useful in our invention include the following:

TABLE I

I. 2-Sulfonamidophenols and 1-sulfonamido-2-naphthols

A. Magenta

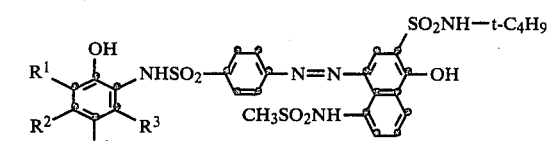

| Compound | $R^1$ | $R^2$ | $R^3$ | $R^4$ |
|---|---|---|---|---|
| 1 | H | $G^1$ | H | $CH_3$ |
| 2 | H | $G^3$ | $G^3$ | H |
| 3 | H | $G^2$ | H | H |
| 4 | H | $G^1$ | H | H |
| 5 | H | $G^3$ | H | H |
| 6 | H | $G^2$ | $G^2$ | H |
| 7 | H | $G^2$ | $G^2$ | $CH_3$ |
| 8 | H | $G^1$ | $NHSO_2CH_3$ | H |
| 9 | H | $G^1$ | OH | H |
| 10 | H | $G^4$ | OH | H |
| 11 | H | H | -Naphtho- with $G^1$ in 7-position | |
| 12 | H | H | -Naphtho- with $G^1$ in 5-position | |
| 13 | H | H | -Naphtho- with $G^3$ in 5-position | |
| 14 | H | H | -Napthto- with $G^3$ in 7-position | |
| 15 | H | $G^1$ | -Naphtho- | |
| 16 | H | $G^4$ | -Naphtho- | |
| 17 | H | H | -Naphtho- with $G^4$ in 7-position | |
| 18 | H | H | -Naphtho- with $G^4$ in 5-position | |

TABLE I-continued

B. Yellow

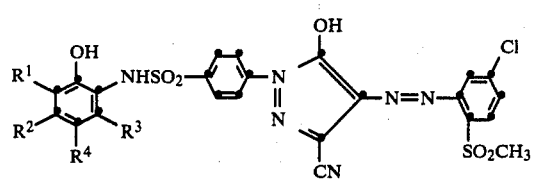

| Compound | R¹ | R² | R³ | R⁴ |
|---|---|---|---|---|
| 19 | H | G² | G² | H |
| 20 | H | H |  | -Naphtho- with G¹ in 7-position |
| 21 | H | G³ | G³ | H |
| 22 | H | G¹ | H | CH₃ |
| 23 | H | G¹ | H | H |
| 24 | H | H |  | -Naphtho- with G⁷ in 5-position |
| 25 | H | H |  | -Naphtho- with G⁴ in 5-position |
| 26 | H | OH | G¹ | H |
| 27 | H | OH | G⁴ | H |

C. Cyan

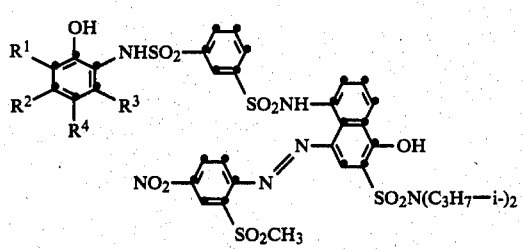

| Compound | R¹ | R² | R³ | R⁴ |
|---|---|---|---|---|
| 28 | H | G² | G² | H |
| 29 | H | G1 | H | CH₃ |
| 30 | H | H |  | -Naphtho- with G¹ in 7-position |
| 31 | H | G¹ | OH | H |
| 32 | H | G¹ | H | CH₂COOCH₃ |
| 33 | H | G¹ | H | CH₂COOH |

II. 4-Sulfonamidophenols

A. Magenta

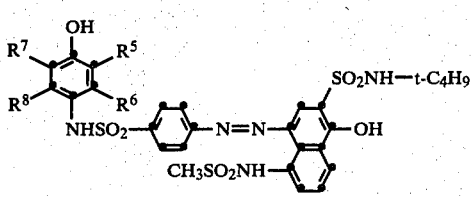

| Compound | R⁵ | R⁶ | R⁷ | R⁸ |
|---|---|---|---|---|
| 34 | CH₃ | H | H | G¹ |
| 35 | H | H | H | G³ |
| 36 | H | H | H | G¹ |
| 37 | H | OCH₃ | H | G¹ |

B. Yellow

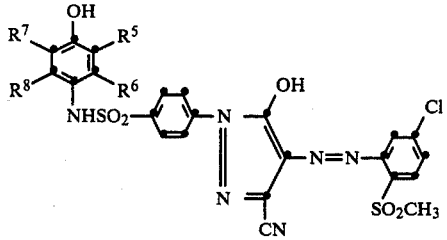

| Compound | R⁵ | R⁶ | R⁷ | R⁸ |
|---|---|---|---|---|
| 38 | H | H | H | G¹ |

C. Cyan

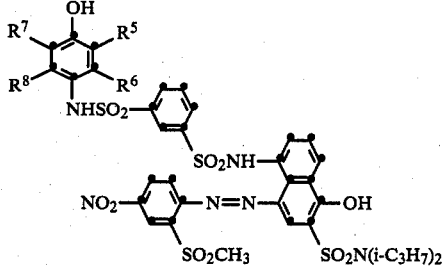

| Compound | R⁵ | R⁶ | R⁷ | R⁸ |
|---|---|---|---|---|
| 39 | CH₃ | H | H | G¹ |

$G^1$ is $-NHSO_2-m-C_6H_4-CON(n-C_{18}H_{37})_2$
$G^2$ is $-NHSO_2-m-C_6H_4-CON(n-C_8H_{17})_2$
$G^3$ is $-NHSO_2-n-C_{16}H_{33}$
$G^4$ is $-NHCOCH(C_2H_5)O-m-C_6H_4-C_{15}H_{31}-n$

The dye moiety useful in the RDR's employed in our invention can be virtually any dye or dye precursor moiety, such moieties being well known to those skilled in the art. They may be metallizable or premetallized, if desired. Dye moieties useful herein include, for example, those disclosed in U.S. Pat. No. 4,076,529 of Fleckenstein et al, the disclosure of which is hereby incorporated by reference, the phenylazonaphthyl dyes of U.S. Pat. Nos. 3,929,760, 3,931,144, 3,932,380, 3,932,381, 3,942,987, 3,954,476, 4,001,204 and 4,013,635; the phenylazopyrazoline dyes of U.S. Pat. No. 4,013,633; the arylazopyrazolotriazole and arylazopyridinol dyes of Baigrie et al U.S. Pat. No. 4,142,891; the arylazo dyes of Landholm et al U.S. Pat. No. 4,156,609; the heterocyclylazonaphthol dyes of Chapman U.S. Pat. No. 4,207,104; the pyridylazopyrazole and pyrimidylazopyrazole dyes of Green U.S. Pat. No. 4,148,641; the arylazopyridinol dyes of Chapman U.S. Pat. No. 4,195,994; the arylazoisoquinolinol dyes of Chapman et al U.S. Pat. No. 4,186,642 and the arylazoenol dyes of Chapman et al. U.S. Pat. No. 4,148,643.

A process for producing a photographic transfer image in color according to the invention comprises:

(a) treating an imagewise-exposed photographic element as described above with an alkaline processing composition in the presence of a silver halide developing agent to effect development of each of the exposed silver halide emulsion layers;

(b) the dye-releasing compound then releasing the diffusible dye imagewise as a function of the development of each of the silver halide emulsion layers; and (c) at least a portion of the imagewise distribution of the dye diffusing to a dye image-receiving layer to form a dye transfer image.

It will be appreciated that, after processing the photographic element described above, there remains in it after transfer has taken place an imagewise distribution of dye in addition to developed silver. A color image comprising residual nondiffusible compound is obtained in this element if the residual silver and silver halide are removed by any conventional manner well known to those skilled in the photographic art, such as a bleach bath, followed by a fix bath, a bleach-fix bath, etc. The imagewise distribution of dye may also diffuse out of the element into these baths, if desired, rather than to an image-receiving element. If a negative-working silver halide emulsion is employed in the photosensitive elements, then a positive color image, such as a reflection print, a color transparency or motion picture film, is produced in this manner. If a direct-positive silver halide emulsion is employed in such photosensitive elements, then a negative color image is produced.

The photographic element in the above-described process can be treated in any manner with an alkaline processing composition to effect or initiate development. A preferred method for applying processing composition is by use of a rupturable container or pod which contains the composition. In general, the processing composition employed in this invention contains the developing agent for development, although the composition could also just be an alkaline solution where the developer is incorporated in the photographic element, image-receiving element or process sheet, in which case the alkaline solution serves to activate the incorporated developer.

A photographic film unit or assemblage in accordance with this invention is adapted to be processed by an alkaline processing composition, and comprises:

(1) a photographic element as described above; and (2) a dye image-receiving layer.

In this embodiment, the processing composition may be inserted into the film unit, such as by interjecting processing solution with communicating members similar to hypodermic syringes which are attached either to a camera or camera cartridge. The processing composition can also be applied by means of a swab or by dipping in a bath, if so desired. Another method of applying processing composition to a film assemblage which can be used in our invention is the liquid spreading means described in U.S. Application Ser. No. 143,230 of Columbus, filed Apr. 24, 1980.

In a preferred embodiment of the invention, the assemblage itself contains the alkaline processing composition and means containing same for discharge within the film unit. There can be employed, for example, a rupturable container which is adapted to be positioned during processing of the film unit so that a compressive force applied to the container by pressure-applying members, such as would be found in a camera designed for in-camera processing, will effect a discharge of the container's contents within the film unit.

The dye image-receiving layer in the above-described film assemblage is optionally located on a separate support adapted to be superposed on the photographic element after exposure thereof. Such image-receiving elements are generally disclosed, for example, in U.S. Pat. No. 3,362,819. When the means for discharging the processing composition is a rupturable container, it is usually positioned in relation to the photographic element and the image-receiving element so that a compressive force applied to the container by pressure-applying members, such as would be found in a typical camera used for in-camera processing, will effect a discharge of the container's contents between the image-receiving element and the outermost layer of the photographic element. After processing, the dye image-receiving element is separated from the photographic element.

The dye image-receiving layer in the above-described film assemblage in another embodiment is located integrally with the photographic element between the support and the lowermost photosensitive silver halide emulsion layer. One useful format for integral receiver-negative photographic elements is disclosed in Belgian Pat. No. 757,960. In such an embodiment, the support for the photographic element is transparent and is coated with an image-receiving layer, a substantially opaque light-reflective layer, e.g., $TiO_2$, and then the photosensitive layer or layers described above. After exposure of the photographic element, a rupturable container containing an alkaline processing composition and an opaque process sheet are brought into superposed position. Pressure-applying members in the camera rupture the container and spread processing composition over the photographic element as the film unit is withdrawn from the camera. The processing composition develops each exposed silver halide emulsion layer and dye images are formed as a function of development which diffuse to the image-receiving layer to provide a positive, right-reading image which is viewed through the transparent support on the opaque reflecting layer background. For other details concerning the format of this particular integral film unit, reference is made to the above-mentioned Belgian Pat. No. 757,960.

Another format for integral negative-receiver photographic elements in which the present invention is useful is disclosed in Canadian Pat. No. 928,559. In this embodiment, the support for the photographic element is transparent and is coated with the image-receiving layer, a substantially opaque, light-reflective layer and the photosensitive layer or layers described above. A rupturable container containing an alkaline processing composition and an opacifier is positioned adjacent the top layer and a transparent top sheet which has thereon a neutralizing layer and a timing layer. The film unit is placed in a camera, exposed through the transparent top sheet and then passed through a pair of pressure-applying members in the camera as it is being removed therefrom. The pressure-applying members rupture the container and spread processing composition and opacifier over the negative portion of the film unit to render it light-insensitive. The processing composition develops each silver halide layer and dye images are formed as a result of development which diffuse to the image-receiving layer to provide a positive, right-reading image which is viewed through the transparent support on the opaque reflecting layer background. For further details concerning the format of this particular integral film unit, reference is made to the above-mentioned Canadian Pat. No. 928,559.

Still other useful integral formats in which this invention can be employed are described in U.S. Pat. Nos. 3,415,644; 3,415,645; 3,415,646; 3,647,437 and 3,635,707. In most of these formats, a photosensitive silver halide emulsion is coated on an opaque support and a dye image-receiving layer is located on a separate transparent support superposed over the layer outermost from the opaque support. In addition, this transparent support also preferably contains a neutralizing layer and a timing layer underneath the dye image-receiving layer.

In another embodiment of the invention, a neutralizing layer and timing layer are located underneath the photosensitive layer or layers. In that embodiment, the photographic element would comprise a support having thereon, in sequence, a neutralizing layer, a timing layer and at least one photosensitive silver halide emulsion layer having associated therewith a dye-releasing compound as described above. A dye image-receiving layer as described above would be provided on a second support with the processing composition being applied therebetween. This format could either be integral or peel-apart as described above.

Another embodiment of the invention uses the image-reversing technique disclosed in British Pat. No. 904,364, page 19, lines 1 through 41. In this process, the dye-releasing compounds are used in combination with physical development nuclei in a nuclei layer contiguous to the photosensitive silver halide emulsion layer. The film unit contains a silver halide solvent, preferably in a rupturable container with the alkaline processing composition.

The film unit or assembly used in the present invention is used to produce positive images in single or multicolors. In a three-color system, each silver halide emulsion layer of the film assembly will have associated therewith a dye-releasing compound which releases a dye possessing a predominant spectral absorption within the region of the visible spectrum to which said silver halide emulsion is sensitive, i.e., the blue-sensitive silver halide emulsion layer will have a yellow or yellow-forming dye-releaser associated therewith, the green-sensitive silver halide emulsion layer will have the magenta or magenta-forming dye-releaser of the invention associated therewith, and the red-sensitive silver halide emulsion layer will have a cyan or cyan-forming dye-releaser associated therewith. The dye-releaser associated with each silver halide emulsion layer is contained either in the silver halide emulsion layer itself or in a layer contiguous to the silver halide emulsion layer.

The concentration of the dye-releasing compounds that are employed in the present invention may be varied over a wide range, depending upon the particular compound employed and the results which are desired. For example, the dye-releasers of the present invention may be coated in layers at a concentration of about 0.1 to about 3 g/m$^2$ by using coating solutions containing between about 0.5 and about 8 percent by weight of the dye-releaser distributed in a hydrophilic film-forming natural material or synthetic polymer, such as gelatin, polyvinyl alcohol, etc., which is adapted to be permeated by aqueous alkaline processing composition.

Depending upon which CAR is used in the present invention, a variety of silver halide developing agents or electron transfer agents (ETA's) are useful in this invention. In certain embodiments of the invention, any ETA can be employed as long as it cross-oxidizes with the dye-releasers described herein. The ETA may also be incorporated in the photosensitive element to be activated by the alkaline processing composition. Specific examples of ETA's useful in this invention include hydroquinone compounds, such as hydroquinone, 2,5-dichlorohydroquinone or 2-chlorohydroquinone; aminophenol compounds, such as 4-aminophenol, N-methylaminophenol, N,N-dimethylaminophenol, 3-methyl-4-aminophenol or 3,5-dibromoaminophenol; catechol compounds, such as catechol, 4-cyclohexylcatechol, 3-methoxycatechol or 4-(N-octadecylamino)-catechol; and phenylenediamine compounds, such as N,N,N',N'-tetramethyl-p-phenylenediamine. In highly preferred embodiments, the ETA is a 3-pyrazolidinone compound, such as 1-phenyl-3-pyrazolidinone (Phenidone), 1-phenyl-4,4-dimethyl-3-pyrazolidinone (Dimezone), 4-hydroxymethyl-4-methyl-1-phenyl-3-pyrazolidinone, 4-hydroxymethyl-4-methyl-1-p-tolyl-3-pyrazolidinone, 4-hydroxymethyl-4-methyl-1-(3,4-dimethylphenyl)-3-pyrazolidinone, 1-m-tolyl-3-pyrazolidinone, 1p-tolyl-3-pyrazolidinone, 1-phenyl-4-methyl-3-pyrazolidinone, 1-phenyl-5-methyl-3-pyrazolidinone, 1-phenyl-4,4-dihydroxymethyl-3-pyrazolidinone, 1,4-dimethyl-3-pyrazolidinone, 4-methyl-3-pyrazolidinone, 4,4-dimethyl-3-pyrazolidinone, 1-(3-chlorophenyl)-4-methyl-3-pyrazolidinone, 1-(4-chlorophenyl)-4-methyl-3-pyrazolidinone, 1-(3-chlorophenyl)-3-pyrazolidinone, 1-(4-chlorophenyl)-3-pyrazolidinone, 1-(4-tolyl)-4-methyl-3-pyrazolidinone, 1-(2-tolyl)-4-methyl-3-pyrazolidinone, 1-(4-tolyl)-3-pyrazolidinone, 1-(3-tolyl)-3-pyrazolidinone, 1-(3-tolyl)-4,4-dimethyl-3-pyrazolidinone, 1-(2-trifluoroethyl)-4,4-dimethyl-3-pyrazolidinone or 5-methyl-3-pyrazolidinone. A combination of different ETA's, such as those disclosed in U.S. Pat. No. 3,039,869, can also be employed. These ETA's are employed in the liquid processing composition or contained, at least in part, in any layer or layers of the photographic element or film unit to be activated by the alkaline processing composition, such as in the silver halide emulsion layers, the dye image-providing material layers, interlayers, image-receiving layer, etc.

In a preferred embodiment of the invention, the silver halide developer or ETA employed in the process becomes oxidized upon development and reduces silver halide to silver metal. The oxidized developer than cross-oxidizes the dye-releasing compound. The product of cross-oxidation then undergoes alkaline hydrolysis, thus releasing an imagewise distribution of diffusible dye which then diffuses to the receiving layer to provide the dye image. The diffusible moiety is transferable in alkaline processing composition either by virtue of its self-diffusivity or by its having attached to it one or more solubilizing groups, for example, a carboxy, sulpho, sulphonamido, hydroxy or morpholino group.

In using the dye-releasing compounds according to the invention which produce diffusible dye images as a function of development, either conventional negative-working or direct-positive silver halide emulsions are employed. If the silver halide emulsion employed is a direct-positive silver halide emulsion, such as an internal-image emulsion designed for use in the internal image reversal process or a fogged, direct-positive emulsion such as a solarizing emulsion, which is developable in unexposed areas, a positive image can be obtained in certain embodiments on the dye image-receiving layer. After exposure of the film unit, the alkaline processing composition permeates the various layers to initiate development of the exposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then crossoxidizes the dye-releasing compounds and the oxidized form of the compounds then undergoes a base-catalyzed reaction to release the dyes imagewise as a function of the imagewise exposure of each of the silver halide emulsion layers. At least a portion of the imagewise distributions of diffusible dyes diffuse to the image-receiving layer to form a positive image of the original subject. After being contacted by the alkaline processing composition, a neutralizing layer in the film unit or image-receiving unit lowers the pH of the film unit or image receiver to stabilize the image.

Internal-image silver halide emulsions useful in this invention are described more fully in the November 1976 edition of *Research Disclosure*, pages 76 through 79, the disclosure of which is hereby incorporated by reference.

The various silver halide emulsion layers of a color film assembly employed in this invention are disposed in the usual order, i.e., the blue-sensitive silver halide emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion layers for absorbing or filtering blue radiation that is transmitted through the blue-sensitive layer. If desired, the selectively sensitized silver halide emulsion layers can be disposed in a different order, e.g., the blue-sensitive layer first with respect to the exposure side, followed by the red-sensitive and green-sensitive layers.

The rupturable container employed in certain embodiments of this invention is disclosed in U.S. Pat. Nos. 2,543,181; 2,643,886; 3,653,732; 2,723,051; 3,056,492; 3,056,491 and 3,152,515. In general, such containers comprise a rectangular sheet of fluid- and air-impervious material folded longitudinally upon itself to form two walls which are sealed to one another along their longitudinal and end margins to form a cavity in which processing solution is contained.

Generally speaking, except where noted otherwise, the silver halide emulsion layers employed in the invention comprise photosensitive silver halide dispersed in gelatin and are about 0.6 to 6 microns in thickness; the dye-releasers are dispersed in an aqueous alkaline solution-permeable polymeric binder, such as gelatin, as a separate layer about 0.2 to 7 microns in thickness; and the alkaline solution-permeable polymeric interlayers, e.g., gelatin, are about 0.2 to 5 microns in thickness. Of course, these thicknesses are approximate only and can be modified according to the product desired.

Scavengers for oxidized developing agent can be employed in various interlayers of the photographic elements of the invention. Suitable materials are disclosed on page 83 on the November 1976 edition of *Research Disclosure*, the disclosure of which is hereby incorporated by reference.

Any material is useful as the image-receiving layer in this invention as long as the desired function of mordanting or otherwise fixing the dye images is obtained. The particular material chosen will, of course, depend upon the dye to be mordanted. Suitable materials are disclosed on pages 80 through 82 of the November 1976 edition of *Research Disclosure*, the disclosure of which is hereby incorporated by reference.

Use of a neutralizing material in the film units employed in this invention will usually increase the stability of the transferred image. Generally, the neutralizing material will effect a reduction in the pH of the image layer from about 13 or 14 to at least 11 and preferably 5 to 8 within a short time after imbibition. Suitable materials and their functioning are disclosed on pages 22 and 23 of the July 1974 edition of *Research Disclosure*, and pages 35 through 37 of the July 1975 edition of *Research Disclosure*, the disclosures of which are hereby incorporated by reference.

A timing or inert spacer layer can be employed in the practice of this invention over the neutralizing layer which "times" or controls the pH reduction as a function of the rate at which alkali diffuses through the inert spacer layer. Examples of such timing layers and their functioning are disclosed in the *Research Disclosure* articles mentioned in the paragraph above concerning neutralizing layers.

The alkaline processing composition employed in this invention is the conventional aqueous solution of an alkaline material, e.g., alkali metal hydroxides or carbonates such as sodium hydroxide, sodium carbonate or an amine such as diethylamine, preferably possessing a pH in excess of 11, and preferably containing a developing agent as described previously. Suitable materials and addenda frequently added to such compositions are disclosed on pages 79 and 80 of the November 1976 edition of *Research Disclosure*, the disclosure of which is hereby incorporated by reference.

The alkaline solution-permeable, substantially opaque, light-reflective layer employed in certain embodiments of photographic film units used in this invention is described more fully in the November 1976 edition of *Research Disclosure*, page 82, the disclosure of which is hereby incorporated by reference.

The supports for the photographic elements used in this invention can be any material as long as it does not deleteriously effect the photographic properties of the film unit and is dimensionally stable. Typical flexible sheet materials are described on page 85 of the November 1976 edition of *Research Disclosure*, the disclosure of which is hereby incorporated by reference.

While the invention has been described with reference to layers of silver halide emulsions and dye image-providing materials, dotwise coating, such as would be obtained using a gravure printing technique, could also be employed. In this technique, small dots of blue-, green- and red-sensitive emulsions have associated therewith, respectively, dots of yellow, magenta and cyan color-providing substances. After development, the transferred dyes would tend to fuse together into a continuous tone. In an alternative embodiment, the emulsions sensitive to each of three primary regions of the spectrum can be disposed as a single segmented layer, e.g., as by the use of microvessels as described in Whitmore U.S. patent application Ser. No. 184,714, filed Sept. 8, 1980.

The silver halide emulsions useful in this invention, both negative-working and direct-positive ones, are well known to those skilled in the art and are described in *Research Disclosure*, Volume 176, December 1978, Item No. 17643, pages 22 and 23, "Emulsion preparation and types"; they are usually chemically and spectrally sensitized as described on page 23, "Chemical sensitization", and "Spectral sensitization and desensitization", of the above article; they are optionally protected against the production of fog and stabilized against loss of sensitivity during keeping by employing the materials described on pages 24 and 25, "Antifoggants and stabilizers", of the above article; they usually contain hardeners and coating aids as described on page 26, "Hardeners", and pages 26 and 27, "Coating aids", of the above article; they and other layers in the photographic elements used in this invention usually contain plasticizers, vehicles and filter dyes described on page 27, "Plasticizers and lubricants"; page 26, "Vehicles and vehicle extenders"; and pages 25 and 26, "Absorbing and scattering materials", of the above article; they and other layers in the photographic elements used in this invention can contain addenda which are incorporated by using the procedures described on page 27, "Methods of addition", of the above article; and they are usually coated and dried by using the various techniques described on pages 27 and 28, "Coating and drying procedures", of the above article, the disclosures of which are hereby incorporated by reference.

The term "nondiffusing" used herein has the meaning commonly applied to the term in photography and denotes materials that, for all practical purposes, do not migrate or wander through organic colloid layers, such as gelatin, in the photographic elements of the invention in an alkaline medium and preferably when processed in a medium having a pH of 11 or greater. The same meaning is to be attached to the term "immobile". The term "diffusible" as applied to the materials of this invention has the converse meaning and denotes materials having the property of diffusing effectively through the colloid layers of the photographic elements in an alkaline medium. "Mobile" has the same meaning as "diffusible".

The term "associated therewith" as used herein is intended to mean that the materials can be in either the same or different layers, so long as the materials are accessible to one another.

The following examples are provided to further illustrate the invention.

EXAMPLE 1—IMAGING TESTS

Imaging tests were performed comparing the RDR compounds of the invention to those of related structures of the prior art. The compounds to be testes were coated in an integral imaging receiver (IIR) element on a transparent polyester support having the following layer structure (coverages in g/m$^2$):

(1) Receiving layer of mixture of gelatin (2.28) and the latex mordant poly(styrene-co-N-vinylbenzyl-N,N-dimethyl-N-benzylammonium sulfate-co-divinylbenzene) (2.28);

(2) Reflecting layer of gelatin (2.63) and TiO$_2$ (16.1);

(3) Interlayer of gelatin (1.23);

(4) Dye-releaser layer of gelatin (2.8)+dye releaser (identified in table; 0.32 mmol/m$^2$) dispersed in half its weight of diethyllauramide;

(5) Emulsion layer of gelatin (1.1) containing a non-spectrally-sensitized 0.8μ silver bromide negative emulsion (0.27 Ag); and (6) Overcoat layer of gelatin (1.1) hardened with 1.5 percent (of total gelatin) bis(vinylsulfonylmethyl)ether.

The samples of these photosensitive elements were exposed to a graduated neutral density test object. A pH 12.3 processing composition, described below, was spread at 22° C. between these photosensitive elements and a cover sheet, described below, by passing the "transfer sandwich" between a pair of juxtaposed rollers. Dye release and diffusion to the receiver takes place for only a finite time before the dye-release is shut down by lowering of the pH. $D_{max}$ and $D_{min}$ were determined by Status A reflection densitometry in the appropriate color.

COVER SHEET

The cover sheet comprised the following layers coated on a transparent polyester support (coverages in g/m$^2$):

(1) Neutralizing layer of poly(butyl acrylate-co-acrylic acid (30:70; 140 meq. acid/m$^2$); and (2) Timing layer of a 1:1 mixture of the vinylidene chloride terpolymer and a polymeric carboxyester-lactone as described in Example 2 of U.S. Pat. No. 4,229,516 (1.1 g/m$^2$).

| Processing Compositions: | pH 13.5* | pH 12.3 |
|---|---|---|
| Potassium hydroxide (as 100%) | 46.8 g | — |
| Tripotassium phosphate | — | 53.1 g |
| 5-Methylbenzotriazole | 4.0 g | 4.0 g |
| 4-Hydroxymethyl-4-methyl-1-p-tolyl-3-pyrazolidinone | 4.0 g | 4.0 g |
| Carboxymethylcellulose | 43.0 g | 43.0 g |
| Water to | 1000.0 ml | 1000.0 ml |
| Developer Layer Thickness | 100.0 μm | 200.0 μm |

*Listed here for convenience of following examples.

Access time tests were run using the same IIR elements and the pH 12.3 processing composition, but using as the cover sheet only a polyester film support. The final $D_{max}$ represents the total amount of dye released, since there is no "shut down" chemistry on the cover sheet to stop the dye from being released. Reflection density readings were taken at 1, 2, and 4 minutes to show qualitatively the relative diffusion rates. A final reading was taken about an hour later.

The following results were obtained:

TABLE II

| RDR Compound No. | Dye Density | | Access Time Reflection Density | | | |
|---|---|---|---|---|---|---|
| | $D_{min}$ | $D_{max}$ | 1 min | 2 min | 4 min | final |
| Magenta Dyes: | | | | | | |
| Magenta Control RDR 1 in 9 Experiments (mean) | 0.21 ±0.06 | 0.86 ±0.07 | 0.47 ±0.05 | 0.80 ±0.06 | 1.15 ±0.09 | 1.42 ±0.15 |
| 1 | 0.44 | 1.57 | 0.88 | 1.40 | 1.77 | 2.12 |
| 2 | 0.26 | 1.85 | 0.82 | 1.51 | 1.90 | 2.17 |
| 4 | N.R. | N.R. | 0.52 | 0.96 | 1.41 | 2.00 |
| 18 | 0.38 | 1.72 | 0.92 | 1.41 | 1.76 | 2.06 |
| 6 | 0.35 | 1.92 | 0.72 | 1.31 | 1.68 | 1.91 |
| 15 | 0.77 | 1.94 | 1.02 | 1.43 | 1.70 | 1.91 |
| 11 | 0.28 | 1.40 | 0.54 | 1.01 | 1.47 | 1.79 |
| 12 | 0.52 | 1.44 | 0.54 | 1.00 | 1.53 | 1.93 |
| 7 | 0.27 | 1.82 | 0.73 | 1.22 | 1.59 | 1.88 |
| 16 | 0.25 | 1.02 | 0.37 | 0.74 | 1.17 | 1.57 |
| 9 | 0.31 | 1.82 | 0.91 | 1.34 | 1.64 | 1.83 |
| Yellow Dyes: | | | | | | |
| Yellow Control RDR 2 in 5 Experiments (mean) | 0.23 ±0.02 | 0.96 ±0.14 | 0.56 ±0.02 | 0.87 ±0.05 | 1.17 ±0.11 | 1.31 ±0.17 |
| 19 | 0.32 | 2.02 | 0.73 | 1.26 | 1.56 | 1.76 |
| 21 | 0.26 | 1.22 | 0.73 | 1.20 | 1.58 | N.R. |
| 22 | 0.38 | 1.19 | 0.72 | 1.33 | 1.72 | N.R. |
| Cyan Dyes: | | | | | | |
| Cyan Control RDR 3 in 5 Experiments (mean) | 0.29 ±0.03 | 0.94 ±0.09 | 0.29 ±0.01 | 0.58 ±0.03 | 0.92 ±0.04 | 1.77 ±0.07 |

TABLE II-continued

| RDR Compound No. | Dye Density | | Access Time Reflection Density | | | |
|---|---|---|---|---|---|---|
| | $D_{min}$ | $D_{max}$ | 1 min | 2 min | 4 min | final |
| 28 | 0.37 | 1.45 | 0.40 | 0.77 | 1.10 | 1.91 |
| 31 | 0.26 | 1.54 | 0.42 | 0.82 | 1.18 | 2.01 |
| 39 | N.R. | N.R. | 0.47 | 0.80 | 1.13 | 2.10 |
| 29 | 0.51 | 1.26 | 0.48 | 0.72 | 1.02 | 1.87 |
| 32 | 0.34 | 1.24 | 0.31 | 0.55 | 0.83 | 1.91 |
| 33 | 0.33 | 1.27 | 0.29 | 0.58 | 0.88 | 1.66 |

N.R. = not run.

Magenta Control RDR 1

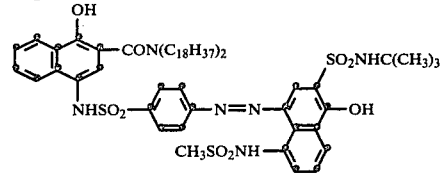

Yellow Control RDR 2

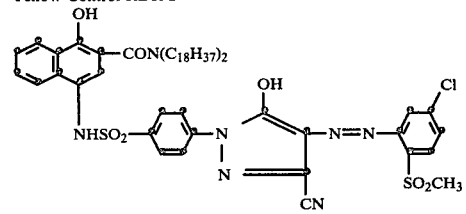

Cyan Control RDR 3

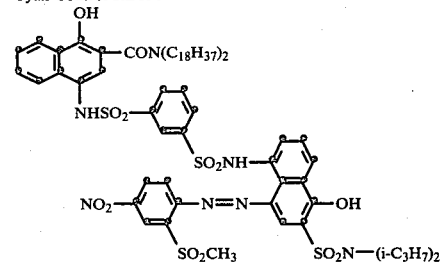

The results indicate that the dye-releasers of the invention are more reactive and react more efficiently at pH 12.3 than the related dye-releasers of the prior art. Significantly greater dye densities are observed on the mordant at any given time.

EXAMPLE 2—COMPETITIVE REACTIVITY OF RDR'S: TWO-SHEET TRANSFER ELEMENTS

A light-sensitive image donor element was prepared containing a single silver halide emulsion layer associated with two different colored RDR compounds as follows:

On a transparent polyester support was coated the following layers (coverages in g/m²):

(1) A RDR layer: Dispersions in gelatin (2.2) of two RDR compounds of two different colors, identified in Table III below, each at 540 μmole/m², dissolved together in diethyllauramide to the extent of half the weight of the combined RDR compounds; and (2) A silver halide emulsion layer comprising a spectrally unsensitized 0.8 μm cubic monodispersed negative silver bromide emulsion (1.1) in gelatin (1.1), hardened with bis(vinylsulfonylmethyl)ether (0.048).

An image receiver was prepared by coating a transparent polyester support with a single layer of a mixture of gelatin (2.3 g/m²) and the latex poly(styrene-co-N-vinylbenzyl-N-benzyl-N,N-dimethylammonium sulfate-co-divinylbenzene) (2.3 g/m²) hardened with formaldehyde (0.057).

The donor element was exposed through a 3.0 log-scale graduated neutral density tablet in an Eastman 1B Sensitometer ®. It was processed by spreading between it and the receiver at 22° C. one of the viscous developing compositions described in Example 1 contained in a pod (see Table III). The transfer "sandwich" was passed between a pair of juxtaposed pressure rollers spaced so as to provide the liquid layer thickness appropriate to the pod compositions as specified in Example 1. The elements were peeled apart after the processing times shown in Table III.

The two RDR compounds present in the layer compete with each other for the available oxidized pyrazolidinone electron transfer agent. Effective competition between RDR compounds in reacting with oxidized electron transfer agent ($ETA_{ox}$) takes place only at relatively low exposure values where the amount of $ETA_{ox}$ formed is low. The more reactive RDR compound is preferentially cross-oxidized by the limited amount of $ETA_{ox}$ present, releasing its dye at a faster rate. As the exposure increases, the available $ETA_{ox}$ increases as a result of developing more silver. As the dye density of the more reactive dye reaches 100 percent, more of the less reactive dye-releaser reacts, generating dye until the dye density of the less reactive one also reaches 100 percent. The activity ratio therefore approaches 1.0 at $D_{max}$ in all comparisons.

Each RDR compound is present in a sufficient quantity to release dye to a full $D_{max}$ value of around 1.2 to 1.8, depending on the extinction coefficient of the dye. Corrections were made in the observed densities for the unwanted absorption of the one released dye as a function of the peak density of the absorption spectrum of the other dye. In each exposure step, this calculated density of each dye was "normalized" as the percentage of the corrected dye $D_{max}$ for that particular color in that particular coating. Comparison of the percentages for the two dyes gives a "competition factor" showing which dye was more reactive. The numerous calculations were performed by computer. Observed densities and percentages of available dye for each color, and the reactivity ratios are given from two selected steps (exposure values) near the toe end of the mid-scale of the sensitometric curve for each color. The following results are obtained:

TABLE III

| Comparison | Process pH (time) | RDR Compound | | Exposure (3.0 log E scale) | Observed Density | | Density as % of $D_{max}$ | | Activity Ratio |
|---|---|---|---|---|---|---|---|---|---|
| | | Yellow | Magenta | | Blue | Green | Blue | Green | |
| 1 | 13.5 (4") | Yellow Control RDR 2 | Magenta Control RDR 1 | 3.0 ($D_{max}$) | 1.33 | 1.67 | 100 | 100 | (Y/M) 1.0 |
| | | | | 1.5 | 0.19 | 0.19 | 13 | 10 | 1.4 |
| | | | | 1.8 | 0.42 | 0.44 | 31 | 25 | 1.3 |
| | | | | | | | | | (Invention/ |

TABLE III-continued

| Comparison | Process pH (time) | RDR Compound Yellow | RDR Compound Magenta | Exposure (3.0 log E scale) | Observed Density Blue | Observed Density Green | Density as % of $D_{max}$ Blue | Density as % of $D_{max}$ Green | Activity Ratio |
|---|---|---|---|---|---|---|---|---|---|
| | | | | | | | | | Control) |
| 2 | 13.5 (4″) | Yellow Control | 1 | 3.0 ($D_{max}$) | 1.24 | 1.46 | 100 | 100 | 1.0 |
| | | RDR 2 | | 1.5 | 0.25 | 0.45 | 15 | 30 | 2.0 |
| | | | | 1.8 | 0.15 | 0.31 | 7 | 20 | 2.9 |
| 3 | 12.3 (4″) | Yellow Control | 1 | 1.5 | 0.08 | 0.26 | 1 | 17 | 17 |
| | | RDR 2 | | 1.8 | 0.06 | 0.16 | 0.8 | 9 | 11 |
| 4 | 13.5 (10″) | Yellow Control | 29 | 1.5 | 0.25 | 0.70 | 17.6 | 30.3 | 1.7 |
| | | RDR 2 | | 1.8 | 0.18 | 0.49 | 12.0 | 20.7 | 1.7 |
| 5 | 13.5 (10″) | 22 | Cyan Control RDR 3 | 1.8 | 0.33 | 0.17 | 32.1 | 5.0 | 6.4 |
| | | | | 2.1 | 0.31 | 0.15 | 30.1 | 4.2 | 7.2 |

The control dye-releasers are representative of the highly reactive compounds of the type described in Fernandex et al. U.S. Pat. No. 4,135,929. In the first comparison, the Yellow Control RDR 2 was found to be slightly more reactive (average factor of 1.4 times) than the corresponding Magenta Control RDR 1. In a parallel experiment (not shown in Table III) wherein the same yellow and magenta dyes were coated at 1080 μmol and 540 μmol levels, respectively, the average of the corresponding activity ratios was 1.3. The activity ratios are thus not significantly affected by varying the initial concentrations of the two RDR's.

In the second comparison, a magenta RDR of the invention varied from 2.0 to 2.9 (average 2.4) times more reactive than the Yellow Control RDR. Interpolating between the Magenta Control RDR 1 and Compound 1, both compared to Yellow Control RDR 2, Compound 1 is about 3.4 times as reactive as Magenta Control RDR 1 at high pH.

The biggest difference between the RDR compounds of the invention and those of the prior art shows up at pH 12.3 processing. The rate of release from Compound 1 was only slightly lower than at pH 13.5, but the rate of release from the Yellow Control RDR 2 at pH 12.3 was only a fraction of that observed at pH 13.5. The activity ratio at pH 12.3 of Compound 1 of the invention over the Yellow Control RDR 2 averaged about 14 compared to 2.4 at pH 13.5.

In comparisons 4 and 5, a cross comparison of a cyan dye-releaser of the invention, Compound 29, with the Yellow Control RDR 2 and of a yellow dye-releaser of the invention, Compound 22, with the Cyan Control RDR 3 at pH 13.5 was run. The cyan dye-releaser of the invention was 1.7 times more reactive than the Yellow Control RDR 2 compound. In the reverse situation, however, the yellow dye-releaser of the invention averaged 6.8 times more reactive than the Cyan Control RDR 3.

EXAMPLE 3—COMPETITIVE REACTIVITY OF RDR'S: INTEGRAL IMAGING RECEIVER ELEMENTS

A light-sensitive integral imaging receiver (IIR) element was prepared containing a single silver halide emulsion layer associated with two RDR compounds (similar to Example 2) as follows:

On a transparent polyester support was coated the following layer (coverages in g/m$^2$):

(1) A receiving layer comprising a mixture of gelatin (2.3) and a polymeric latex poly(styrene-co-N-vinylbenzyl-N,N-dimethylammonium sulfate-co-divinylbenzene);

(2) A reflecting layer of titanium dioxide pigment (16.1) in gelatin (2.6);

(3) A gelatin interlayer (1.2);

(4) A layer containing gelatin (2.2) and separate dispersions of a yellow RDR compound (0.32 mmol/m$^2$) and a magenta RDR compound (0.48 mmol/m$^2$) (See Table IV), each in half its weight of diethyllauramide;

(5) A silver halide emulsion layer comprising a spectrally unsensitized 0.8 μm cubic monodispersed negative silver bromide emulsion (0.27) in gelatin (1.1); and (6) A hardened gelatin overcoat layer (1.1).

These IIR elements were exposed as in Example 2 and processed by spreading between it and a transparent polyester cover sheet at 22° C. one of the viscous processing compositions described in Example 1 contained in a pod (See Table IV) under the same conditions as in Example 2. The transfer sandwich was left laminated together, however.

The RDR compounds thus compete in the same manner for ETA$_{ox}$ as in Example 2. In order to interpret the density in terms of dye concentrations, the Status A reflection densities were converted to transmission densities by the relation $D_T = -0.2026 + 0.8350 D_R - 0.5142 D_R^2 + 0.2157 D_R^3$, wherein $D_T$ is the calculated transmission density and $D_R$ is the measured Status A reflection density measured with a Macbeth color densitometer. The transmission density data was treated as in Example 2 and the data for the exposure value 1.95 in all instances is presented in Table IV.

TABLE IV

| Comparison | Process pH | RDR Compound Yellow | RDR Compound Magenta | Density as % of $D_{max}$ Blue | Density as % of $D_{max}$ Green | Activity Ratio Y/M | Relative Activity vs. Control Magenta RDR 2 or Control Yellow RDR 2 |
|---|---|---|---|---|---|---|---|
| 1 | 13.5 | Yellow | Magenta | 46 | 36 | 1.3 | — |

TABLE IV-continued

| Comparison | Process pH | RDR Compound Yellow | RDR Compound Magenta | Density as % of $D_{max}$ Blue | Density as % of $D_{max}$ Green | Activity Ratio Y/M | Relative Activity vs. Control Magenta RDR 2 or Control Yellow RDR 2 |
|---|---|---|---|---|---|---|---|
| 2 | 13.5 | Control RDR 2 Yellow Control RDR 2 | Control RDR 1 1 | 43 | 70 | 0.61 | 2.1 |
| 3 | 13.5 | 22 | Magenta Control RDR 1 | 80 | 38 | 2.1 | 1.6 |
| 4 | 13.5 | Yellow Control RDR 2 | 6 | 45 | 72 | 0.63 | 2.1 |
| 5 | 13.5 | 19 | Magenta Control RDR 1 | 73 | 32 | 2.3 | 1.8 |
| 6 | 12.3 | Yellow Control RDR 2 | Magenta Control RDR 1 | 22 | 17 | 1.3 | — |
| 7 | 12.3 | Yellow Control RDR 2 | 1 | 6.9 | 68 | 0.10 | 13 |
| 8 | 12.3 | 22 | Magenta Control RDR 1 | 67 | 3.9 | 17 | 13 |
| 9 | 12.3 | Yellow Control RDR 2 | 6 | 19 | 53 | 0.36 | 3.8 |
| 10 | 12.3 | 19 | Magenta Control RDR 1 | 49 | 7.8 | 6.3 | 4.8 |

Under the high pH processing conditions (pH 13.5), the Yellow and Magenta Control RDR's have an activity ratio of 1.3, corroborating the data of the two-sheet transfer format of Example 2. The magenta RDR compound 1 and compound 6 of the invention each are about 2.1 times more reactive than the Magenta Control RDR 1, when all are compared against the same Yellow Control RDR 2. The yellow RDR compound 22 and compound 19 of the invention are comparably 1.6 and 1.8 times more reactive than the Yellow Control RDR 2, when all are compared against the same Magenta Control RDR 1.

Under the lower pH processing conditions of pH 12.3, the Yellow and Magenta Control RDR's have about the same activity ratio relative to each other as at high pH. However, the magenta RDR's of the invention are 13 and 3.8 times more reactive than the Magenta Control RDR 1, and the yellow RDR's of the invention are 13 and 4.8 times more reactive than the Yellow Control RDR 2. Thus the reactivity advantages of the dyes of the invention are even more important when processing at lower pH.

EXAMPLE 4 SYNTHESIS OF RDR COMPOUND 9

To a stirred solution of 2-amino-5-(m-dioctadecylcarbamoylbenzenesulfonamido)resorcinol hydrochloride (4.3 g, 5 mmole) in pyridine (70 ml) was added the dye sulfonyl chloride 4-[3-t-butylsulfamoyl-4-hydroxy-8-methanesulfonamido-1-naphthylazo]benzenesulfonyl chloride (see U.S. Pat. No. 3,954,476) (3.2 g, 5.5 mmole). The mixture was stirred overnight, then poured into ice water (700 ml) and acidified with hydrochloric acid (100 ml). The resulting precipitate was collected, washed well with water, and air dried.

The crude product was chromatographed on silica gel using 1:1 tetrahydrofuran (THF):heptane as eluent. The appropriate band was collected and the solvent removed under reduced pressure. The product was triturated with heptane to yield 2.8 g (41.2 percent). Thin layer chromatography (TLC) showed the product to be pure.

| Combustion Analysis | Theoretical | Found |
|---|---|---|
| N | 7.2 | 6.8 |
| C | 61.5 | 60.5 |
| H | 7.9 | 7.7 |

Intermediates:

A. 2-Amino-5-(m-dioctadecylcarbamoylbenzenesulfonamido)resorcinol hydrochloride

To a suspension of N,N-dioctadecyl-m-(2-methyl-4-hydroxy-6-benzoxazolylsulfamoyl)benzamide benzoxazole (17.3 g, 0.02 mole) in methanol (170 ml) was added hydrogen chloride gas. The mixture warmed, and complete solution resulted. Hydrogen chloride addition was continued until saturation had been achieved. The mixture was then refluxed for four hours, then allowed to stand at ambient temperature overnight. The resulting white precipitate was collected and dried to yield 15.3 g (88.4 percent). TLC showed the product to be pure.

B. N,N-Dioctadecyl-m-(2-methyl-4-hydroxy-6-benzoxazolylsulfamoyl)benzamide

To a stirred solution of the 6-amino-4-hydroxy-2-methylbenzoxazole (4.1 g, 0.025 mole) in pyridine (190 ml) was added N,N-dioctadecyl-3-chlorosulfonylbenzamide (Example 5) (18.8 g, 0.026 mole). The mixture was stirred at ambient temperature overnight, then poured into ice water (2 liters) and acidified with hydrochloric acid (200 ml). The resulting precipitate was collected, washed well with water, and dried to yield a tan solid (17.3 g, 81.2 percent). TLC showed the product to be homogeneous.

C. 6-Amino-4-hydroxy-2-methylbenzoxazole

To a solution of 6-nitro-4-hydroxy-2-methylbenzoxazole (5.1 g, 0.026 mole) in THF (100 ml) and methanol (50 ml) were added about 0.5 g of 10 percent palladium on carbon. The mixture was placed on the Parr-shaker apparatus and hydrogenated two hours. At this time hydrogen uptake was complete (6.3 psi, 0.079 mole). The catalyst was removed and the solvents were removed under reduced pressure. The resulting off-white solid (4.1 g, 97.0 percent) was collected and dried. TLC showed the product to be pure. A ninhydrin test for amines was positive. A silver test for hydroxylamine was negative.

D. 6-Nitro-4-hydroxy-2-methylbenzoxazole

To a stirred solution of the 2-amino-5-nitroresorcinol (2.9 g, 0.017 mole) in toluene (50 ml) and THF (5 ml) was added triethyl orthoacetate (4.1 g, 0.0255 mole). This mixture was heated to reflux for one hour. Upon cooling, the product crystallized out of solution and was collected and dried to yield a tan solid (1.3 g, 39.4 percent). TLC showed the product to be pure.

E. 2-Amino-5-nitroresorcinol

2-Acetamido-5-nitroresorcinol ditosylate (9.0 g, 0.017 mole) was added to cold sulfuric acid (25 ml, at or below 10° C.). The mixture was stirred cold an additional fifteen minutes and then at ambient temperature for 1.5 hours. The mixture was then poured into 250 ml ice water and sodium hydroxide (30 g, 0.75 mole) was slowly added. The mixture was then treated with sodium bicarbonate until it was no longer acidic, and aqueous solution was extracted twice with ethyl acetate (150 ml). The extracts were combined, dried over anhydrous magnesium sulfate, and evaporated under reduced pressure to yield a light yellow solid (2.5 g, 86.2 percent). TLC showed the product was pure.

F. 2-Acetamido-5-nitroresorcinol ditosylate

A solution of 2-acetamidoresorcinol ditosylate (11.9 g, 0.025 mole) in acetic anhydride (75 ml) was cooled to below 15° C. Meanwhile, nitric acid (1.9 ml, 0.029 mole) was slowly added to cold acetic anhydride (20 ml) with stirring so that the temperature did not exceed 25° C. The nitric acid solution was then added to the cold acetanalide solution. Finally, the sulfuric acid (0.75 ml) was added. The mixture was stirred an additional six hours, during which time the reaction temperature rose to 30° C. The mixture was pured into ice water (1500 ml) and stirred one hour. The resulting precipitate was collected, air dried, and recrystalllized from isopropyl alcohol (100 ml) to yield a tan crystallline solid (9.9 g, 76.0 percent). TLC showed the product to be pure.

G. 2-Acetamidoresorcinol ditosylate

To a stirred solution of aniline B (43.3 g, 0.1 mole) in DMA (300 ml) and pyridine (100 ml) at $\leq 10°$ C. was added acetyl chloride (11.8 g, 0.15 mole). The mixture was stirred overnight at ambient temperature, then poured into ice water (3 liters) acidified with hydrochloric acid (100 ml). The resulting white precipitate was collected and dried, and the crude product was recrystallized from isopropyl alcohol (150 ml) to yield a white solid (28.9 g, 60.8 percent). TLC showed the product to be homogeneous.

H. 2-Aminoresorcinol ditosylate

To 2-nitroresorcinol ditosylate (46.3 g, 0.1 mole) dissolved in THF (650 ml) was added 5 g of Raney Nickel. The reaction was then placed on the Parr-shaker apparatus and hydrogenated at 40 psi. After four hours, the reaction had consumed all of the hydrogen (12 psi, 0.3 mole). The catalyst was removed by filtration and the solvent evaporated under reduced pressure at 40° C. A white crystalline solid was recovered (42.0 g, 97.0 percent). TLC showed the product to be pure.

I. 2-Nitroresorcinol ditosylate

To a stirred solution of 2-nitroresorcinol (31.0 g, 0.2 mole) and p-toluenesulfonyl(tosyl) chloride (83.9 g, 0.44 mole) in THF (500 ml) at $\leq 15°$ C. was added triethylamine (84 ml, 0.6 mole) at such a rate that the temperature did not exceed 15° C. The mixture was stirred two additional hours at ambient temperature. The reaction was then poured into ice water (5 liters) and hydrochloric acid (100 ml) with stirring. The resulting precipitate was collected, air dried, and recrystallized from acetonitrile (250 ml) to yield 85.6 g (92.3 percent) of a white crystalline product. Thin layer chromatography (TLC) showed the product to be pure.

EXAMPLE 5 SYNTHESIS OF RDR COMPOUND 1

To a stirred solution of 2-amino-5-(m-dioctadecylcarbamoylbenzenesulfonamido)-p-cresol hydrochloride (8.6 g, 0.01 mol) in 90 ml of pyridine was added the dye sulfonyl chloride, 4-[3-t-butylsulfamoyl-4-hydroxy-8-methanesulfonamido-1-naphthylazo]benzenesulfonyl chloride (See U.S. Pat. No. 3,954,476) (5.8 g, 0.01 mol). The mixture was stirred 4 hours, another 0.6 g of dye was added and stirring continued 2 hours. The mixture was poured into excess aqueous hydrochloric acid, extracted with ethyl acetate and concentrated to a red glass. This residue was chromatographed on silica gel with 50, 67 and then 80 percent tetrahydrofuran (THF) in hexane. Yield 4.3 g (32 percent) of the product. Calculated for $C_{71}H_{109}N_7O_{11}S_4$: C=62.5, H=8.0, N=7.2, S=9.4. Found: C=61.3, H=7.8, N=6.7, S=9.0.

Intermediates

A. 2-Amino-5-(m-dioctadecylcarbamoylbenzenesulfonamido)-p-cresol hydrochloride

To a stirred solution of 6-amino-2,5-dimethylbenzoxazole (14.8 g, 0.1 mol) in 100 ml of pyridine and 500 ml of dichloromethane was added N,N-dioctadecyl-3-chlorosulfonylbenzamide (72.4 g, 0.1 mol). The mixture was stirred overnight and then washed with water, 10 percent aqueous hydrochloric acid and again with water. To the organic layer was added 10 ml of hydrochloric acid, 300 ml of water and 1000 ml of THF. The mixture was stirred overnight and the precipitate collected, washed with acetonitrile and nearly dried. The damp filter cake was placed in 2 liters of THF and 50 ml of concentrated hydrochloric acid and refluxed 2 hours. The mixture was concentrated to an oil and triturated with one liter of acetonitrile to yield 77.5 g (90 percent) of the product.

B. 6-Amino-2,5-dimethylbenzoxazole

A mixture of 2,5-dimethyl-6-nitrobenzoxazole (153 g, 0.86 mol) and 10 percent palladium on carbon (1.5 g) in THF was hydrogenated at 40 psi and 40° C. for one hour. The catalyst was filtered and the filtrate was concentrated to an oil. Trituration with ligroin yielded 125 g (98 percent) of crystalline product.

C. 2,5-Dimethyl-6-nitrobenzoxazole

To a stirred solution of 2-amino-5-nitro-p-cresol (3.3 g, 0.0146 mol) in xylene (35 ml) was added the triethylorthoacetate (6.4 g, 0.0392 mol) in one portion. The mixture was refluxed for one hour, filtered through a pad of decolorizing carbon and concentrated to dryness under reduced pressure. The residue was triturated with ligroin and 2.7 g (71 percent) of white solid was collected. NMR was consistent for the product.

D. 2-Amino-5-nitro-p-cresol

To 120 ml of stirring concentrated sulfuric acid at room temperature was added 12.0 g (0.0252 mol) of 5-nitro-2-p-toluenesulfonamido-p-cresol tosylate. Complete solution occurred without exotherm in 15 minutes. After stirring 1½ hours the reaction was poured into 1500 ml of water and extracted with ethyl acetate. The organic layer was washed with aqueous sodium carbonate, dried over magnesium sulfate and concentrated under reduced pressure to yield 3.6 g (85 percent) of pure product as an orange solid.

E. 5-Nitro-2-p-toluenesulfonamido-p-cresol tosylate

While stirring at reflux, a solution of ditosylate (F. below) (12.6 g, 0.029 mol) in 125 ml of acetic acid was treated dropwise with 1.4 ml (0.032 mol) of 70 percent nitric acid over a 20-minute period. After complete addition the reaction was stirred at reflux for 4 hours. Another 0.4 ml of nitric acid and 4 hours stirring at reflux resulted in complete reaction. The reaction was stirred at room temperature overnight and 10.2 g (74 percent) of cream-colored precipitate (G. below) was collected.

Calculated for $C_{21}H_{20}N_2O_7S_2$: C=52.9, H=4.2, N=5.9, S=13.5. Found: C=52.7, H=4.5, N=6.0, S=13.2.

F. 2-p-Toluenesulfonamido-p-cresol tosylate

To a stirred solution of 2-amino-p-cresol (12.3 g, 0.10 mol) in 125 ml of pyridine was added p-toluenesulfonyl chloride (38.1 g, 0.20 mol) in one portion. Stirring was continued overnight at ambient temperature. TLC now indicated no starting material, but there were two products. Another 7.6 g (20 percent excess) of p-toluenesulfonyl chloride was added and stirring continued for 6 hours. The reaction was poured into excess hydrochloric acid and stirred until completely solidified. The tan solid precipitate was filtered, washed with water and nearly dried. The damp filter cake was dissolved in one liter of boiling ethanol and let stand overnight at ambient temperature. Yield 33.0 g (76 percent) of crystals. NMR was consistent for the product.

Calculated for $C_{21}H_{21}NO_5S_2$: C=58.5, H=4.9, N=3.2, S=14.9. Found: C=58.2, H=5.0, N=3.3, S=15.1.

G. N,N-Dioctadecyl-3-chlorosulfonylbenzamide

To a stirred solution of 3-chlorosulfonylbenzoyl chloride (25.0 g, 1.1406 mol) in 250 ml of THF at 0° C. was added in one portion a cold suspension of dioctadecylamine (59.3 g, 0.1137 mol) and N,N-diisopropylethylamine (13.5 g, 0.1406 mol) in 500 ml of THF. The addition was exothermic to ≃10° C. The reaction was stirred without cooling overnight. The white insolubles were filtered and the filtrate poured into dilute hydrochloric acid. The aqueous mixture was extracted with ethyl acetate and the organic layer washed with water, dried over anhydrous magnesium sulfate and concentrated to dryness under aspirator pressure at 35° C. The resulting 68 g (90 percent) of yellow oil slowly crystallized. NMR was consistent for the product.

Calculated for $C_{43}H_{78}ClNO_3S$: C=71.3, H=10.8, Cl=4.9, N=1.9, S=4.4. Found: C=70.1, H=10.5, Cl=4.8, N=2.0, S=4.7.

EXAMPLE 6 SYNTHESIS OF RDR COMPOUND 12

To a stirred solution of 1-amino-5-(m-dioctadecylcarbamoylbenzenesulfonamido)-2-naphthol (8.6 g, 0.01 mol) in THF and pyridine (100 ml each) was added the dye sulfonyl chloride of Example 5 (5.8 g, 0.01 mol). The reaction was stirred overnight at room temperature, poured into excess dilute hydrochloric acid and extracted with ethyl acetate. The organic layer was washed with water, dried over magnesium sulfate and concentrated to a glass. The glass was chromatographed on silica gel with THF and hexane (1:1) to obtain 3.5 g (25 percent) of pure product.

Calculated for $C_{74}H_{109}N_7O_{11}S_4$: C=63.5, H=7.8, N=7.1, S=9.2. Found: C=62.5, H=8.7, N=7.0, S=8.9.

Intermediates

A. 1-Amino-5-(m-dioctadecylcarbamoylbenzenesulfonamido)-2-naphthol

A mixture of the azo dye, 1-(2,5-dichlorophenylazo)-5-(m-dioctadecylcarbamoylbenzenesulfonamido)-2-naphthol (10.2 g, 0.01 mol) and 10 percent palladium on carbon (1.5 g) was hydrogenated at 40 psi and room temperature for 2 hours. The catalyst was filtered and the solution kept under nitrogen during its immediate use in the above reaction.

B. 1-(2,5-Dichlorophenylazo)-5-(m-dioctadecylcarbamoylbenzenesulfonanido-2-naphthol A combination of 2,5-dichloroaniline (5.9 g, 0.036 mol) and concentrated hydrochloric acid (30 ml, 0.36 mol) in 90 ml of water was heated to solution and then cooled to a suspension at 5° C. The stirred suspension was treated with sodium nitrite (2.7 g, 0.039 mol) in 10 ml of water at 5°-10° C., then stirred one hour at 0°-10° C. The resulting solution was added slowly to a stirred solution of the coupler, N,N-dioctadecyl-3-(6-hydroxy-1-naphthylsulfamoyl)benzamide, and ammonium acetate (29.3 g, 0.38 mol) in 500 ml of acetic acid and 250 ml of THF. The reaction was stirred one hour and diluted with 2 liters of water. The precipitate was collected, dissolved in 400 ml of acetone, diluted with 200 ml of ethanol, heated to reflux and chilled to yield 22.7 g of product.

Calculated for $C_{59}H_{88}Cl_2N_4O_4S$: C=69.5, H=8.7, Cl=6.9, N=5.5, S=3.1. Found: C=69.8, H=8.9, Cl=6.7, N=5.3, S=3.0.

C. N,N-Dioctadecyl-3-(6-hydroxy-1-naphthylsulfamoyl)benzamide

To a stirred solution of 5-amino-2-naphthol (8.0 g, 0.05 mol) in pyridine (80 ml) was added the sulfonyl chloride, N,N-dioctadecyl-3-chlorosulfonylbenzamide (Example 5) (36.2 g, 0.05 mol). The reaction was stirred overnight at room temperature and then poured into excess dilute hydrochloric acid. The mixture was extracted with dichloromethane, washed with water, dried over magnesium sulfate and suction-filtered through a pad of decolorizing carbon. The filtrate was concentrated to an oil which was crystallized from acetonitrile to yield 26.5 g of product.

Calculated for $C_{53}H_{86}N_2O_4S$: C=75.1, H=10.2, N=3.3, S=3.8. Found: C=74.5, H=10.6, N=3.8, S=3.6.

EXAMPLE 7 SYNTHESIS OF RDR COMPOUND 11

To a stirred solution of 1-amino-7-(m-dioctadecylcarbamoylbenzenesulfonamido)-2-naphthol hydrochloride (10.8 g, 0.012 mol) in pyridine (100 ml) was added the dye sulfonyl chloride of Example 5 (6.9 g, 0.012 mol). The reaction was stirred 3 hours, poured into dilute aqueous hydrochloric acid and extracted with ethyl acetate. The organic layer was washed with water, dried over magnesium sulfate and concentrated to a glass. The residue was dissolved in THF and hexane (2:1) and chromatographed on silica gel. The product from the column was recrystallized from methanol to yield 5.0 g of pure product (30 percent).

Calculated for $C_{74}H_{109}N_7O_{11}S_4$: C=63.9, H=7.2, N=7.0, S=9.2. Found: C=63.3, H=7.9, N=7.1, S=9.3.

Intermediates:

A. 1-Amino-7-(m-dioctadecylcarbamoylbenzenesulfonamido-2-naphthol

A mixture of the azo dye 1-(2,5-dichlorophenylazo)-7-(m-dioctadecylcarbamoylbenzenesulfonamido)-2-naphthol (23.0 g, 0.0225 mol), concentrated hydrochloric acid (3.0 ml, 0.036 mol) and 10 percent palladium on carbon (1.5 g) in 200 ml of the THF was hydrogenated at 40 psi and ambient temperature for 3 hours. The catalyst was filtered, 3.7 ml of concentrated hydrochloric acid was added and the mixture concentrated to dryness. The residue was triturated with 200 ml of acetonitrile to yield 21.5 g of the product contaminated by 2.5-dichloroaniline.

B. 11 -(2,5-Dichlorophenylazo)-7-(m-dioctadecylcarbamoylbenzenesulfonamido)-2-naphthol This compound was prepared by the method of Example 6B. Yield: 88 percent.

Calculated for $C_{59}H_{88}Cl_2N_4O_4S$: C=69.5, H=8.7, Cl=6.9, N=5.5, S=3.1. Found: C=68.3, H=8.9, Cl=6.1, N=5.3, S=2.9.

C. N,N-dioctadecyl-3-(7-hydroxy-2-naphtylsulfamoyl)benzamide

This compound was prepared by the method of Example 6C from 7-amino-2-naphthol. Yield 73 percent.

Calculated for $C_{53}H_{86}N_2O_4S$: C=71.1, H=10.2, N=3.3, S=3.8. Found: C=74.9, H=10.2, N=3.4, S=3.7.

EXAMPLE 8 COMPARATIVE IMAGING TEST

2-Sulfonamidophenol RDR compounds 1, 2 and 4 of the invention were compared to: (1) Control RDR Compound X having a sulfonamido group in the 3-position as shown below in Table V and 2) Control RDR Compound Y having a methoxy group in the 4-position. The imaging tests were carried out with pH 13.5 processing as in Example 1. The following results were obtained:

TABLE V

| Compound | $R^1$ | $R^2$ | $R^3$ | $R^4$ | Access Time Reflection Density 2 min | 4 min |
|---|---|---|---|---|---|---|
| 1 | H | *$G^1$ | H | $CH_3$ | 1.78 | 1.93 |
| 2 | H | *$G^3$ | *$G^3$ | H | 1.78 | 1.93 |
| 4 | H | *$G^1$ | H | H | 1.74 | 1.99 |
| Control RDR Compound X | H | H | *$G^2$ | $CH_3$ | 0.71 | 1.17 |
| Control RDR Compound Y | H | *$G^1$ | H | $OCH_3$ | 1.53 | 1.73 |

*See Table I for identification.

The results indicate that 2-sulfonamidophenol compounds of the invention which have a sulfonamido group in the 5-position, (Compounds 1 and 4) or in both the 3- and 5-positions (Compound 2) are of comparably high reactivity. Control RDR Compound X with a sulfonamido group in the 3-position only, however, was much less reactive. Control RDR Compound Y illustrates the rate suppressing effect of having a methoxy group in the 4-position, especially when compared to the 4-unsubstituted or 4-methyl analogues.

EXAMPLE 9 COMPARATIVE IMAGING TEST

1-Sulfonamido-2-naphthol RDR compounds 11 and 12 of the invention were compared to Control RDR Compound Z which has a sulfonamido group in the 8-position as shown below in Table VI. The imaging tests were carried out with pH 12.3 processing as in Example 1. The following results were obtained:

TABLE VI

| Compound | Position of Attachment of $G^1$* | Access Time Reflection Density 2 min | 4 min |
|---|---|---|---|
| 11 | 7-position | 1.01 | 1.47 |
| 12 | 5-position | 1.78 | 1.53 |
| Control RDR Compound Z | 8-position | 0.91 | 1.25 |

*See Table I for identification.

The results indicate that 1-sulfonamido-2-naphthol compounds of the invention which have a sulfonamido group in the 5- or 7-positions release dye at a substantially faster rate than Control RDR Compound Z which has a sulfonamido group in the 8-position.

The invention has been described in detail with particular reference to preferred embodiments thereof, but it will be understood that variations and modifications can be effected within the spirit and scope of the invention.

What is claimed is:

1. In a photographic element comprising a support having thereon at least one photosensitive silver halide emulsion layer, said emulsion layer having associated therewith a nondiffusible, redox, dye-releasing compound comprising a ballasted, sulfonamidophenol or sulfonamidonaphthol compound having a dye moiety attached thereto through the sulfonamido group of said compound, said sulfonamido group being located in a position which is conjugated with respect to the position of the hydroxy group of said compound, the improvement wherein:

(a) said compound has at least one substituent thereon in a position which is conjugated with respect to the position of said sulfonamido group, said substituent being selected from the group consisting of OH, $NHSO_2R$ and NHCOR, wherein R is alkyl having from 1 to about 40 carbon atoms, substituted alkyl having from 1 to about 40 carbon atoms, aryl having from 6 to about 50 carbon atoms, or substituted aryl having from 6 to about 50 carbon atoms, and (b) said compound not having a hydroxy, alkoxy, aryloxy, sulfonamido, phosphonamido or carbonamido group thereon in a position which is conjugated with respect to the position of the hydroxy group of said compound, with the proviso that when said compound is a 2-sulfonamidophenol, said substituent is located in the 5-position or in both the 3- and 5-positions.

2. The photographic element of claim 1 wherein said substituent is said $NHSO_2R$ group.

3. The photographic element of claim 1 wherein said compound comprises a 2-sulfonamidophenol, a 4-sulfonamidophenol, a 2-sulfonamido-1-naphthol, a 1-sulfonamido-2-naphthol or a 4-sulfonamido-1-naphthol.

4. The photographic element of claim 3 wherein said substituent is $NHSO_2$—m—$C_6H_4$—$CON(n-C_{18}H_{37})_2$, $NHSO_2$—m—$C_6H_4$—$CON(n-C_8H_{17})_2$, $NHSO_2$—n—$C_{16}H_{33}$ or $NHCOCH-(C_2H_5)O$—m—$C_6H_4$—$C_{15}H_{3-1-n}$.

5. The photographic element of claim 1 which comprises a red-sensitive silver halide emulsion layer having a cyan dye-releasing compound associated therewith, a green-sensitive silver halide emulsion layer having a magenta dye-releasing compound associated therewith, and a blue-sensitive silver halide emulsion layer having a yellow dye-releasing compound associated therewith, and wherein at least one of said dye-releasing compounds being a compound as described in claim 1.

6. The photographic element of claim 1 wherein said compound is a 2-sulfonamidophenol having said substituent in the 5-position or in both the 3- and 5-positions.

7. The photographic element of claim 1 wherein said compound is a 4-sulfonamidophenol having said substituent in the 3-position.

8. The photographic element of claim 1 wherein said compound is a 2-sulfonamido-1-naphthol having said substituent in the 3- and/or 6- and/or 8-position.

9. The photographic element of claim 1 wherein said compound is a 1-sulfonamido-2-naphthol having said substituent in the 4- and/or 5- and/or 7-position.

10. The photographic element of claim 1 wherein said compound is a 4-sulfonamido-1-naphthol having said substituent in the 3- and/or 6- and/or 8-position.

11. In a photographic assemblage comprising:
(I) a support having thereon at least one photosensitive silver halide emulsion layer, said emulsion layer having associated therewith a nondiffusible, redox, dye-releasing compound comprising a ballasted, sulfonamidophenol or sulfonamidonaphthol compound having a dye moiety attached thereto through the sulfonamido group of said compound, said sulfonamido group being located in a position which is conjugated with respect to the position of the hydroxy group of said compound; and
(II) a dye image-receiving layer; the improvement wherein:
(a) said compound has at least one substituent thereon in a position which is conjugated with respect to the position of said sulfonamido group, said substituent being selected from the group consisting of OH, $NHSO_2R$ and NHCOR, wherein R is alkyl having from 1 to about 40 carbon atoms, substituted alkyl having from 1 to about 40 carbon atoms, aryl having from 6 to about 50 carbon atoms, or substituted aryl having from 6 to about 50 carbon atoms, and
(b) said compound not having a hydroxy, alkoxy, aryloxy, sulfonamido, phosphonamido or carbonamido group thereon in a position which is conjugated with respect to the position of the hydroxy group of said compound,
with the proviso that when said compound is a 2-sulfonamidophenol, said substituent is located in the 5-position or in both the 3- and 5-positions.

12. In a photographic assemblage comprising:
(I) a support having thereon at least one photosensitive silver halide emulsion layer, said emulsion layer having associated therewith a nondiffusible, redox, dye-releasing compound comprising a ballasted, sulfonamidophenol or sulfonamidonaphthol compound having a dye moiety attached thereto through the sulfonamido group of said compound, said sulfonamido group being in a position which is conjugated with respect to the position of the hydroxy group of said compound;
(II) a dye image-receiving layer; and
(III) an alkaline processing composition and means for discharging same within said assemblage; said assemblage containing a silver halide developing agent; the improvement wherein:
(a) said compound has at least one substituent thereon in a position which is conjugated with respect to the position of said sulfonamido group, said substituent being selected from the group consisting of OH, $NHSO_2R$ and NHCOR, wherein R is alkyl having from 1 to about 40 carbon atoms, substituted alkyl having from 1 to about 40 carbon atoms, aryl having from 6 to about 50 carbon atoms, or substituted aryl having from 6 to about 50 carbon atoms, and
(b) said compound not having a hydroxy, alkoxy, aryloxy, sulfonamido, phosphonamido or carbonamido group thereon in a position which is conjugated with respect to the position of the hydroxy group of said compound,
with the proviso that when said compound is a 2-sulfonamidophenol, said substituent is located in the 5-position or in both the 3- and 5-positions.

13. The assemblage of claim 12 wherein said substituent is said $NHSO_2R$ group.

14. The assemblage of claim 12 wherein said compound comprises a 2-sulfonamidophenol, a 4-sulfonamidophenol, a 2-sulfonamido-1-naphthol, a 1-sulfonamido-2-naphthol or a 4-sulfonamido-1-naphthol.

15. The assemblage of claim 14 wherein said substituent is $NHSO_2$—m—$C_6H_4$—$CON(n-C_{18}H_{37})_2$, $NHSO_2$—m—$C_6H_4$—$CON(n-C_8H_{17})_2$, $NHSO_2$—n—$C_{16}H_{33}$ or $NHCOCH(C_2H_5)O$—m—$C_6H_4$—$C_{15}H_{3-1-n}$.

16. The assemblage of claim 12 which comprises a red-sensitive silver halide emulsion layer having a cyan dye-releasing compound associated therewith, a green-sensitive silver halide emulsion layer having a magenta dye-releasing compound associated therewith, and a blue-sensitive silver halide emulsion layer having a yellow dye-releasing compound associated therewith, and wherein at least one of said dye-releasing compounds being a compound as described in claim 13.

17. The assemblage of claim 12 wherein said compound is a 2-sulfonamidophenol having said substituent in the 5-position or in both the 3- and 5-positions.

18. The assemblage of claim 12 wherein said compound is a 4-sulfonamidophenol having said substituent in the 3-position.

19. The assemblage of claim 12 wherein said compound is a 2-sulfonamido-1-naphthol having said substituent in the 3- and/or 6- and/or 8-position.

20. The assemblage of claim 12 wherein said compound is a 1-sulfonamido-2-naphthol having said substituent in the 4- and/or 5- and/or 7-position.

21. The assemblage of claim 12 wherein said compound is a 4-sulfonamido-1-naphthol having said substituent in the 3- and/or 6- and/or 8-position.

22. The photographic assemblage of claim 12 wherein:
  (a) said dye image-receiving layer is located between said support and said silver halide emulsion layer; and
  (b) said assemblage also includes a transparent cover sheet over the layer outermost from said support.

23. The photographic assemblage of claim 22 wherein said cover sheet has thereon, in sequence, a neutralizing layer and a timing layer.

24. The photographic assemblage of claim 23 wherein said discharging means is a rupturable container containing said alkaline processing composition and an opacifying agent, said container being so positioned during processing of said assemblage that a compressive force applied to said container will effect a discharge of the container's contents between said transparent sheet and the layer outermost from said support.

25. The photographic assemblage of claim 12 wherein said support having thereon said photosensitive silver halide emulsion layer is opaque and said dye image-receiving layer is located on a separate transparent support superposed over the layer outermost from said opaque support.

26. The photographic assemblage of claim 25 wherein said transparent support has thereon, in sequence, a neutralizing layer, a timing layer and said dye image-receiving layer.

27. In an integral photographic assemblage comprising:
  (I) a photosensitive element comprising a transparent support having thereon the following layers in sequence: a dye image-receiving layer, an alkaline solution-permeable, light-reflective layer, an alkaline solution-permeable, opaque layer, a red-sensitive silver halide emulsion layer having a ballasted cyan dye-releaser associated therewith, a green-sensitive silver halide emulsion layer having a ballasted magenta dye-releaser associated therewith, and a blue-sensitive silver halide emulsion layer having a ballasted yellow dye releaser associated therewith, each said dye-releaser comprising a ballasted, sulfonamidophenol or sulfonamidonaphthol compound having a dye moiety attached thereto through the sulfonamido group of said compound, said sulfonamido group being located in a position which is conjugated with respect to the position of the hydroxy group of said compound;
  (II) a transparent sheet superposed over said blue-sensitive silver halide emulsion layer and comprising a transparent support having thereon, in sequence, a neutralizing layer and a timing layer; and
  (III) a rupturable container containing an alkaline processing composition and an opacifying agent which is so positioned during processing of said assemblage that a compressive force applied to said container will effect a discharge of the container's contents between said transparent sheet and said blue-sensitive silver halide emulsion layer; said assemblage containing a silver halide developing agent; the improvement wherein:
  (a) said compound has at least one substituent thereon in a position which is conjugated with respect to the position of said sulfonamido group, said substituent being selected from the group consisting of OH, $NHSO_2R$ and NHCOR, wherein R is alkyl having from 1 to about 40 carbon atoms, substituted alkyl having from 1 to about 40 carbon atoms, aryl having from 6 to about 50 carbon atoms, or substituted aryl having from 6 to about 50 carbon atoms,
  and
  (b) said compound not having a hydroxy, alkoxy, aryloxy, sulfonamido, phosphonamido or carbonamido group thereon in a position which is conjugated with respect to the position of the hydroxy group of said compound,
  with the proviso that when said compound is a 2-sulfonamidophenol, said substituent is located in the 5-position or in both the 3- and 5-positions.

28. A process for producing a photographic transfer image in color in an imagewise-exposed photographic element comprising a support having thereon at least one photosensitive silver halide emulsion layer, said emulsion layer having associated therewith a nondiffusible, redox, dye-releasing compound comprising a ballasted, sulfonamidophenol or sulfonamidonaphthol compound having a dye moiety attached thereto through the sulfonamido group of said compound, said sulfonamido group being located in a position which is conjugated with respect to the position of the hydroxy group of said compound, said compound having at least one substituent thereon in a position which is conjugated with respect to the position of said sulfonamido group, said substituent being selected from the group consisting of OH, $NHSO_2R$ and NHCOR, wherein R is alkyl having from 1 to about 40 carbon atoms, substituted alkyl having from 1 to about 40 carbon atoms, aryl having from 6 to about 50 carbon atoms, or substituted aryl having from 6 to about 50 carbon atoms, said compound not having a hydroxy, alkoxy, aryloxy, sulfonamido, phosphonamido or carbonamido group thereon in a position which is conjugated with respect to the position of the hydroxy group of said compound,
  with the proviso that when said compound is a 2-sulfonamidophenol, said substituent is located in the 5-position or in both the 3- and 5-positions; said process comprising:
  (a) treating said photographic element with an alkaline processing composition in the presence of a silver halide developing agent to effect development of each of the exposed silver halide emulsion layers;
  (b) said dye-releasing compound then releasing said diffusible dye-releasing compound imagewise as a function of said development of each of said silver halide emulsion layers; and
  (c) at least a portion of said imagewise distribution of said dye-releasing compound diffusing to a dye image-receiving layer to form said dye transfer image.

* * * * *